United States Patent
Balhiser et al.

(10) Patent No.: US 7,057,425 B2
(45) Date of Patent: Jun. 6, 2006

(54) PROPAGATION OF A DYNAMIC SIGNAL TO A QUASI-DIFFERENTIAL RECEIVER BIASED BY AN UNGROUNDED DRIVER-SIDE BIAS SIGNAL

(75) Inventors: David D. Balhiser, Fort Collins, CO (US); Jason Todd Gentry, Wellington, CO (US)

(73) Assignee: Avago Technologies General IP Pte. Ltd., Singapore (SG)

(*) Notice: Subject to any disclaimer, the term of this patent is extended or adjusted under 35 U.S.C. 154(b) by 7 days.

(21) Appl. No.: 10/854,103

(22) Filed: May 25, 2004

(65) Prior Publication Data
US 2005/0264326 A1    Dec. 1, 2005

(51) Int. Cl.
*H03K 19/175* (2006.01)
(52) U.S. Cl. ..................... 327/108; 327/318
(58) Field of Classification Search ............. 327/108, 327/112, 317–309, 333; 326/86, 30, 83, 326/8
See application file for complete search history.

(56) References Cited

U.S. PATENT DOCUMENTS

| | | | |
|---|---|---|---|
| 3,453,447 A | 7/1969 | Campanella | |
| 4,066,918 A | 1/1978 | Heuner et al. | |
| 4,630,284 A * | 12/1986 | Cooperman | 375/257 |
| 4,760,433 A | 7/1988 | Young et al. | |
| 4,952,916 A | 8/1990 | Taplin | |
| 5,444,751 A | 8/1995 | Sage | |
| 5,525,933 A | 6/1996 | Matsuki et al. | |
| 5,574,395 A | 11/1996 | Kusakabe | |
| 5,656,873 A | 8/1997 | O'Loughlin et al. | |
| 5,781,028 A * | 7/1998 | Decuir | 326/30 |
| 5,825,240 A | 10/1998 | Geis et al. | |
| 5,880,621 A | 3/1999 | Ohashi | |
| 6,201,405 B1* | 3/2001 | Hedberg | 326/30 |
| 6,351,171 B1 | 2/2002 | Balhiser | |
| 6,600,339 B1* | 7/2003 | Forbes et al. | 326/86 |
| 6,670,830 B1* | 12/2003 | Otsuka et al. | 326/86 |
| 6,704,365 B1* | 3/2004 | Haycock | 375/257 |
| 6,822,498 B1* | 11/2004 | Schroeder et al. | 327/291 |
| 6,852,613 B1* | 2/2005 | Forbes et al. | 438/598 |

* cited by examiner

*Primary Examiner*—Dinh T. Le

(57) ABSTRACT

In one disclosed method, a dynamic signal is driven onto a driven end of a first signal line, and an ungrounded bias signal is driven onto a driven end of a second signal line. The ungrounded bias signal is then received at a receiving end of the second signal line, and the dynamic signal is received at a receiving end of the first signal line. The receiving end of the second signal line is coupled to a first input of a quasi-differential receiver, and the receiving end of the first signal line is coupled to a second input of the receiver. The ungrounded bias signal is used to bias a toggle point of the receiver, and the dynamic signal is used to toggle an output of the receiver. Variations of this method, and apparatus that can perform this and other methods, are also disclosed.

17 Claims, 4 Drawing Sheets

PROPAGATION OF A DYNAMIC SIGNAL TO A QUASI-DIFFERENTIAL RECEIVER BIASED BY AN UNGROUNDED DRIVER-SIDE BIAS SIGNAL

BACKGROUND

In an ideal environment, an electrical signal applied to a driven end of a signal line would instantaneously propagate to a receiving end of the signal line, and graphs of the electrical signal obtained from the driven and receiving ends of the signal line would be the same. In the real world, however, this does not occur. In addition to the inherent delay that is imparted to an electrical signal as a result of the impedance of the signal line over which it propagates, the propagation of an electrical signal is influenced by a host of physical and environmental factors, such as manufacturing variance, line coupling (e.g., capacitive and inductive coupling to adjacent signal lines), radio frequency (RF) and microwave interference, and temperature. These factors may variously result in signal delay, signal skew or signal noise.

SUMMARY OF THE INVENTION

One aspect of the invention is embodied in a method that comprises driving a dynamic signal onto a driven end of a first signal line, and driving an ungrounded bias signal onto a driven end of a second signal line. The ungrounded bias signal is then received at a receiving end of the second signal line, and the dynamic signal is received at a receiving end of the first signal line. The receiving end of the second signal line is coupled to a first input of a quasi-differential receiver, and the receiving end of the first signal line is coupled to a second input of the receiver. The ungrounded bias signal is used to bias a toggle point of the receiver, and the dynamic signal is used to toggle an output of the receiver.

Another aspect of the invention is embodied in apparatus comprising a receiver, first and second signal lines, a dynamic signal driver, and an ungrounded bias signal driver. The receiver has first and second transistors that are coupled to an output node to respectively pull the output node to first and second voltages. The first and second signal lines are respectively coupled to the first and second transistors. The dynamic signal driver is coupled to the first signal line; and the ungrounded bias signal driver is coupled to the second signal line.

Other embodiments of the invention are also disclosed.

BRIEF DESCRIPTION OF THE DRAWINGS

Illustrative and presently preferred embodiments of the invention are illustrated in the drawings, in which.

DETAILED DESCRIPTION OF THE INVENTION

Figure 1:
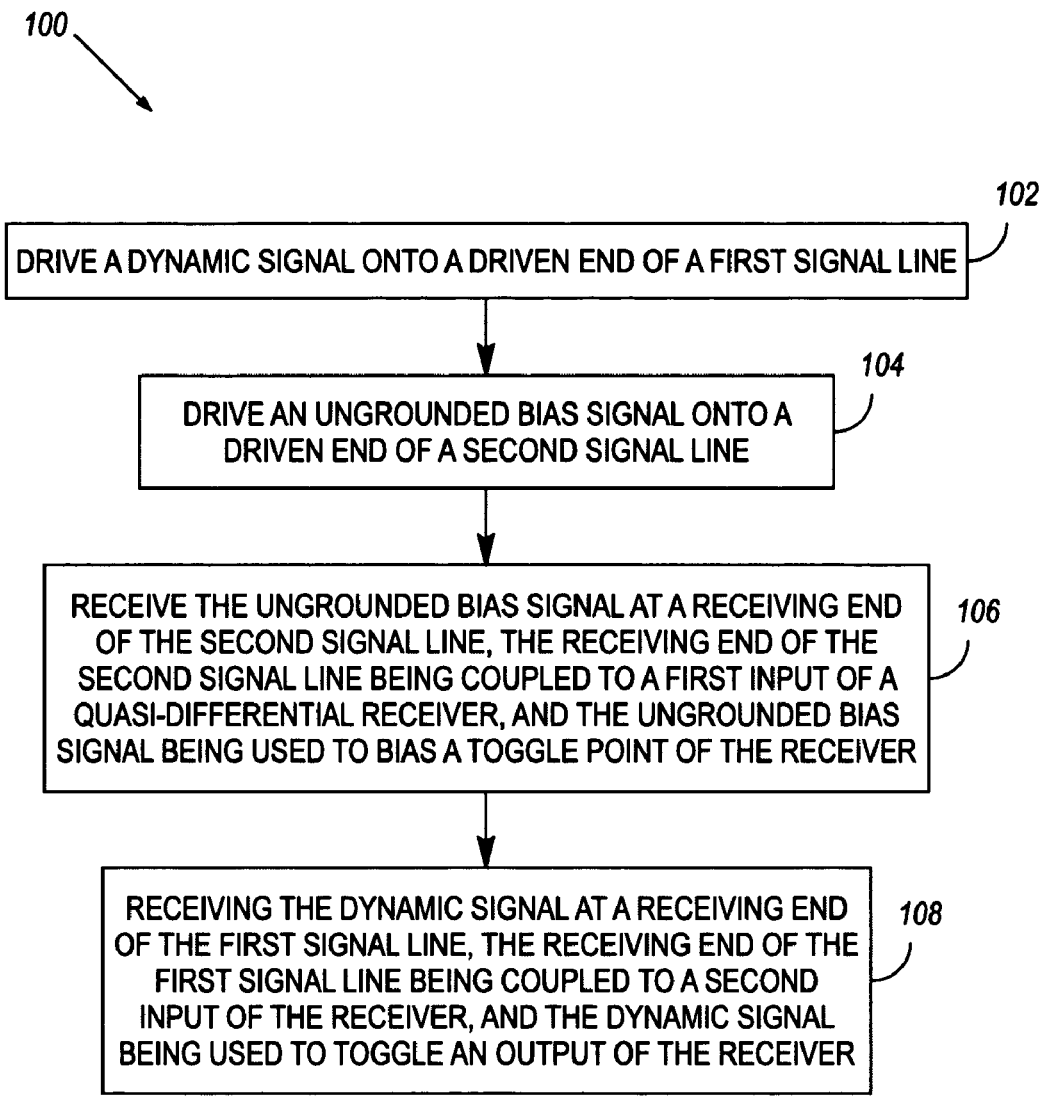
FIG. 1 illustrates a method for propagating a dynamic signal between two points.

FIG. 1 illustrates a method 100 for propagating a dynamic signal (i.e., a changing signal) between two points. The method 100 comprises driving 102 the dynamic signal onto a driven end 204 of a first signal line 202, and driving an ungrounded bias signal onto a driven end 210 of a second signal line 208. See, for example, the circuit 200 shown in FIG. 2. The ungrounded bias signal is then received 104 at a receiving end 212 of the second signal line 208, and the dynamic signal is received 106 at a receiving end 206 of the first signal line 202. The receiving end 212 of the second signal line 208 is coupled to a first input of a quasi-differential receiver 214, and the receiving end 206 of the first signal line 202 is coupled to a second input of the receiver 214. The ungrounded bias signal is used to bias a toggle point of the receiver 214, and the dynamic signal is used to toggle an output of the receiver 214.

The ungrounded bias signal (or "driver-side" bias) disclosed above provides a partially floating bias that, in turn, can provide at least some common-mode noise rejection for the dynamic signal transmitted over the signal line 202.

Figure 2:
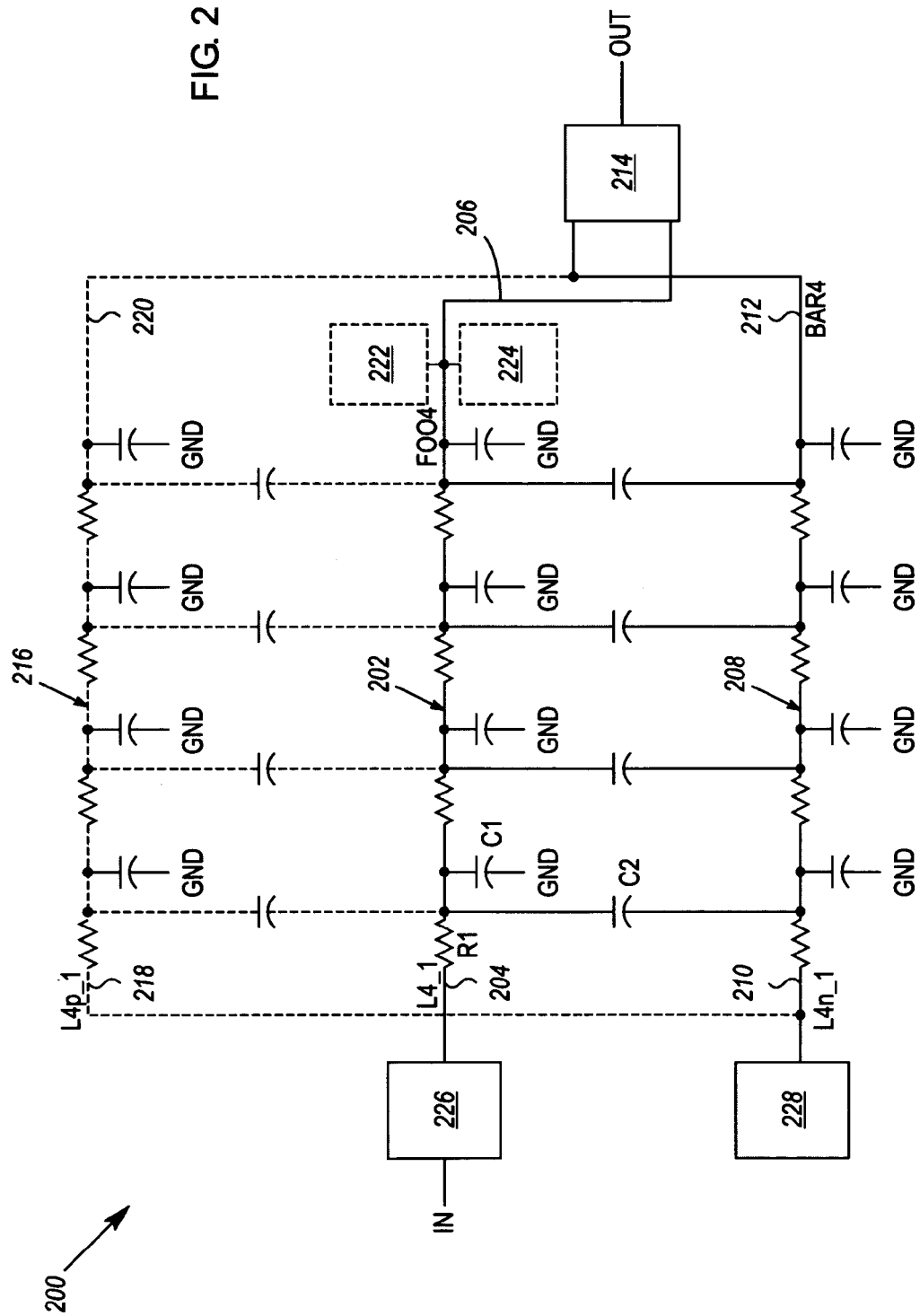
FIG. 2 illustrates a circuit that can be used to perform the method shown in FIG. 1.

Each of the signal lines 202, 208, 218 shown in FIG. 2 carries an RC delay, and experiences coupling effects with other signal lines (e.g. capacitive and inductive coupling). Some of these effects are illustrated in FIG. 2 by the exemplary impedances R1, C1 and C2. Unlike the inputs to a full differential receiver, only one input to the receiver 214 is dynamically driven (thus, the labeling of the receiver 214 as a "quasi-differential" receiver). With such a receiver 214, dynamic power is only consumed for driving one line. Furthermore, there is no converse capacitive coupling (MCF=2) between the lines 202, 208, but only a passive capacitive coupling (MCF=1).

In one embodiment of the method 100, the first and second signal lines 202, 208 are routed adjacent and substantially parallel to each other. In this manner, the second signal line 208 provides electromagnetic shielding for the first signal line 202 (i.e., the line over which the dynamic signal propagates). Optionally, a third signal line 216 may be routed adjacent and substantially parallel to the first signal line 202, opposite a side of the first signal line on which the second signal line 208 runs. The method 100 may then comprise driving the ungrounded bias signal onto a driven end 218 of the third signal line; receiving the ungrounded signal at a receiving end 220 of the third signal line 216 (the receiving end 220 of the third signal line 216 being coupled to the first input of the receiver 214); and routing the third signal line 216 adjacent and substantially parallel to the first signal line 202, opposite a side of the first signal line on which the second signal line 208 runs. In this manner, the first, second and third signal lines 202, 208, 216 form a quasi-coax signal line structure. Signal lines carrying the same or different ungrounded bias signal could also be routed above and below the first signal line 202.

In another embodiment of the method 100, the voltage swing of the first signal line 202 is clamped in proximity to its receiving end 206, thereby limiting the range of voltages allowed at the signal line's receiving end 206 to a range of voltages that is smaller than a range of voltages allowed at the driven end 204 of the signal line 202. Such a voltage clamping method is taught in the U.S. Pat. No. 6,351,171 of Balhiser entitled "Accelerated Interconnect Transmission via Voltage Clamping Toward Toggle Point". As shown in FIG. 2, separate voltage clamps 222, 224 may be used to clamp the upper and lower limits of the voltage swing and, in some cases, only one or the other of the clamps 222, 224 might be employed. Although the voltage clamps 222, 224 are optional, circuit performance may be significantly slowed if they are not used (and especially if clamp 222 is missing).

As further shown in FIG. 2, a dynamic signal may be driven onto the first signal line 202 by means of a driver 226, and an ungrounded bias signal may be driven onto the second (and possibly third) signal line 208 by means of a driver 228. Each of these drivers 226, 228 may be variously adjusted to influence operation of the circuit 200. More specifically, the output impedance of the driver 228 may be adjusted to set a desired balance between 1) float of the second signal line 208, and 2) the electromagnetic shielding of the first signal line 202 that is provided by the second signal line 208. For example, increasing the impedance will allow more float, while decreasing the impedance will provide more shielding.

Figure 3:
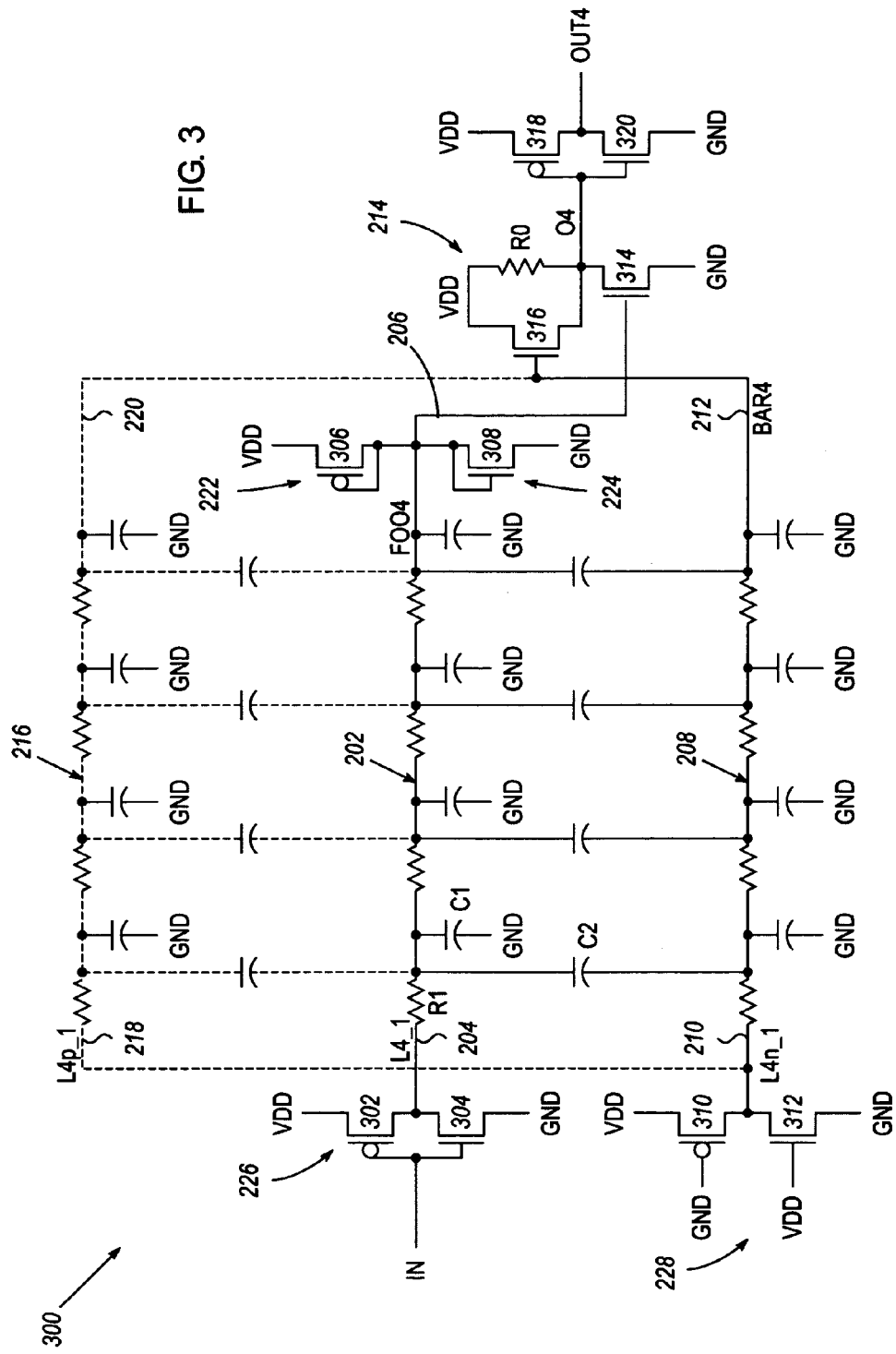
FIG. 3 illustrates an exemplary embodiment of the circuit shown in FIG. 2.

FIG. 3 illustrates an exemplary embodiment 300 of the circuit 200. In the circuit 300, the dynamic signal driver 226 is implemented by means of first and second transistors 302, 304, each of which receives the dynamic signal that is to be driven to the signal line 202, and each of which is coupled to the driven end 202 of the signal line 202 to respectively pull the signal line 202 to a first or second voltage (e.g., a positive voltage (VDD) or ground (GND)). As shown, one of the transistors 302 may be a p-channel field effect transistor (PFET) that is coupled between VDD and the line 202 via its source and drain terminals. The other transistor 304 may be an n-channel FET (NFET) that is likewise coupled between the line 202 and ground via its source and drain terminals.

In the circuit 300, each of the voltage clamps 222, 224 proximate to the receiver 214 is implemented as a diode-connected NFET 306, 308. By means of the NFETs 306, 308, the voltage at the receiver 214 is prevented from reaching either of voltages VDD or GND. By limiting the voltage swing of the dynamic signal received by the receiver 214, charge on the line 202 can be limited, and dynamic signals can propagate through the circuit 300 more quickly. Although both of the voltage clamps 222, 224 are optional, one variant of the circuit 300 utilizes only the clamp 222, but not the clamp 224.

The bias driver 228 is implemented in the circuit 300 using first and second transistors 310, 312 that are coupled to the driven end 210 of line 208 similarly to how the transistors 302, 304 of the dynamic signal driver 226 are coupled to the line 202. However, the gate of the PFET 310 is tied to ground (GND), and the gate of the NFET 312 is tied to the voltage VDD. The transistors may be variously sized, and the ratio of their drive strengths may be adjusted, to adjust the toggle point of the receiver 214. Furthermore, the transistors' drive strengths may be scaled to adjust the output impedance of the driver 226. As previously mentioned, increasing the impedance will allow more float of line 208, while decreasing the impedance will provide more shielding for line 202.

The receiver 214 is implemented by means of first and second NFETs 314, 316, each of which is coupled to the output node O4 to respectively pull the output node to GND or VDD. The first and second signal lines 202, 208 are respectively coupled to the NFETs 314, 316. Coupled in parallel with the NFET 316 is a resistor R0. The resistor R0 is also used to bias the toggle point of the receiver 214. In one embodiment, the resistor R0 is used to provide a substantially stronger bias to the output node O4 than the NFET 316 (e.g., by a 90:10 ratio). However, the ratio of bias provided by the two devices 316, R0 can be adjusted to suit a given application of the circuit 300. Increasing the value of resistor R0 lowers the toggle point of the receiver 214, but lowering the value of resistor R0 allows signal edges at node O4 to rise faster. Also, the ratio of drive strengths between NFET 314 and NFET 316 may be adjusted. In one embodiment, the drive strength of NFET 314 is substantially stronger than the drive strength of NFET 316.

Given the clamped voltage swing at the receiving end 206 of the line 202, output node O4 may be coupled to an inverting and amplifying buffer 318, 320 that provides output OUT4.

Figure 4:
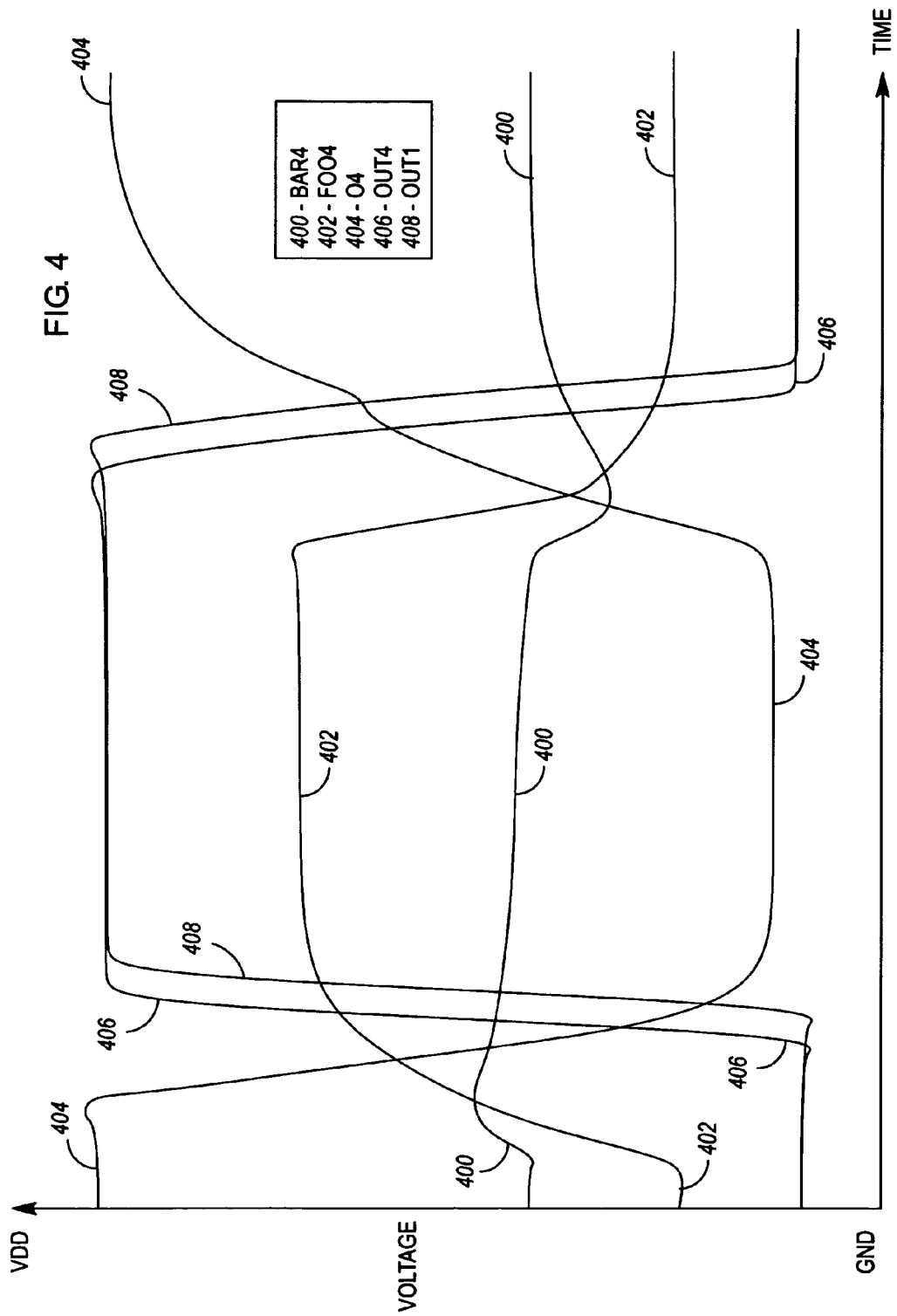
FIG. 4 illustrates a graph of waveforms that may appear at various nodes of the circuit shown in FIG. 3.

FIG. 4 illustrates a SPICE simulation of one implementation of circuit 300. Waveform 400 shows the hybrid float/static behavior of the ungrounded bias signal at node BAR4 (see FIG. 3). Waveform 402 shows the behavior of the dynamic signal at node FOO4. Waveform 404 shows the receiver output signal at node O4, and waveform 406 shows the buffered version of the receiver's output appearing at node OUT4. As an exemplary indication of the dynamic signal acceleration that may be achieved using the circuit 300, waveform 408 (OUT1) shows the exemplary output of a single-ended receiver receiving the same dynamic signal provided to circuit 300. In some test cases, the circuit 300 has reduced propagation delay of a dynamic signal on the order of 20%. Circuit operating frequency has also been increased on the order of 20%.

In one embodiment, the circuit 300 may be used in conjunction with the circuit modifications taught in U.S. patent application Ser. No. 10/728,604 of Balhiser entitled "Driver-Side Current Clamping with Non-Persistent Charge Boost" (filed Dec. 5, 2003).

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. Apparatus, comprising:
    a receiver having first and second transistors, wherein each of the first and second transistors has i) a gate to receive an input signal, ii) a drain that is coupled to an output node, and iii) a source that is coupled to a respective one of first and second voltages, wherein assertion of one of the input signals to the first and second transistors causes a respective one of the first and second transistors to pull the output node to a respective one of the first and second voltages;
    first and second signal lines, respectively coupled to the gates of the first and second transistors;
    a dynamic signal driver, coupled to a driven end of the first signal line, wherein the driven end of the first signal line is spaced from the gate of the first transistor by a length of the first signal line; and
    an ungrounded bias signal driver, coupled to a driven end of the second signal line, wherein the driven end of the second signal line is spaced from the gate of the second transistor by a length of the second signal line.

2. The apparatus of claim 1, further comprising a first voltage clamp, coupled to the first signal line in proximity to said receiver, to prevent voltages at the gate of the first transistor from reaching said first voltage.

3. The apparatus of claim 2, further comprising a second voltage clamp, coupled to the first signal line in proximity to said receiver, to prevent voltages at the gate of the first transistor from reaching said second voltage.

4. The apparatus of claim 1, further comprising a resistor, coupled in parallel with the second transistor to bias a toggle point of the receiver.

5. The apparatus of claim 4, wherein the resistor provides a substantially stronger bias to the output node than does the second transistor.

6. The apparatus of claim 1, wherein the bias signal driver comprises third and fourth transistors, wherein each of the third and fourth transistors has i) a gate to receive an input signal, ii) a drain that is coupled to the driven end of the second signal line, and iii) a source that is coupled to a respective one of the first and second voltages, wherein assertion of one of the input signals to the third and fourth transistors causes a respective one of the transistors to pull the driven end of the second signal line to a respective one of the first and second voltages, the third and fourth transistors being sized to adjust a toggle point of the receiver.

7. The apparatus of claim 1, wherein the first and second signal lines run adjacent and substantially parallel to each other.

8. The apparatus of claim 7, further comprising a third signal line that runs adjacent and substantially parallel to the first signal line, opposite a side of the first signal line on which the second signal line runs.

9. The apparatus of claim 1, further comprising a buffer, coupled to said output node to invert and amplify a dynamic signal appearing thereon.

10. A method, comprising:
   driving a dynamic signal onto a driven end of a first signal line;
   driving an ungrounded bias signal onto a driven end of a second signal line; receiving the ungrounded bias signal at a receiving end of the second signal line, said receiving end of the second signal line being coupled to a first input of a quasi-differential receiver, and said ungrounded bias signal being used to bias a toggle point of the receiver; and
   receiving the dynamic signal at a receiving end of the first signal line, said receiving end of the first signal line being coupled to a second input of the receiver, and said dynamic signal being used to toggle an output of the receiver.

11. The method of claim 10, further comprising, routing said first and second signal lines adjacent and substantially parallel to each other.

12. The method of claim 11, further comprising:
   driving said ungrounded bias signal onto a driven end of a third signal line;
   receiving the ungrounded signal at a receiving end of the third signal line, said receiving end of the third signal line being coupled to said first input of the receiver; and
   routing the third signal line adjacent and substantially parallel to the first signal line, opposite a side of the first signal line on which the second signal line runs.

13. The method of claim 10, further comprising, adjusting an output impedance of a device that drives the ungrounded bias signal onto the second signal line, thereby setting a desired balance between i) float of the second signal line, and ii) electromagnetic shielding of the first signal line provided by the second signal line.

14. The method of claim 13, wherein said output impedance is adjusted by scaling drive strengths of first and second transistors, said first and second transistors being coupled to the driven end of the second signal line to respectively pull the driven end of the second signal line to first and second voltages.

15. The method of claim 10, further comprising, clamping a voltage swing of the first signal line, in proximity to the receiver.

16. The method of claim 10, further comprising:
   providing said receiver with a second means to bias the toggle point of the receiver; and
   adjusting a ratio of toggle point bias provided by i) the ungrounded bias signal, and ii) the second means.

17. The method of claim 16, wherein said second means is a resistor.

* * * * *